UNITED STATES PATENT OFFICE.

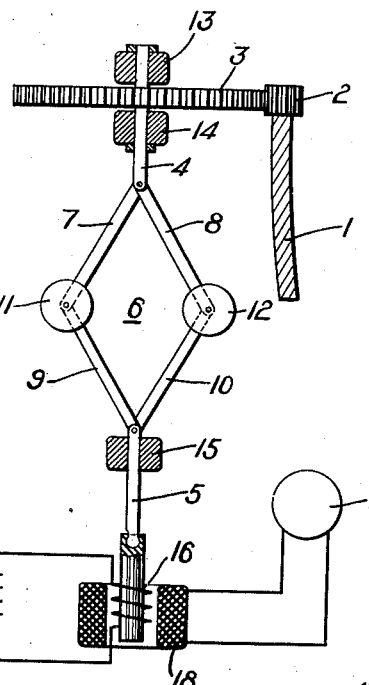
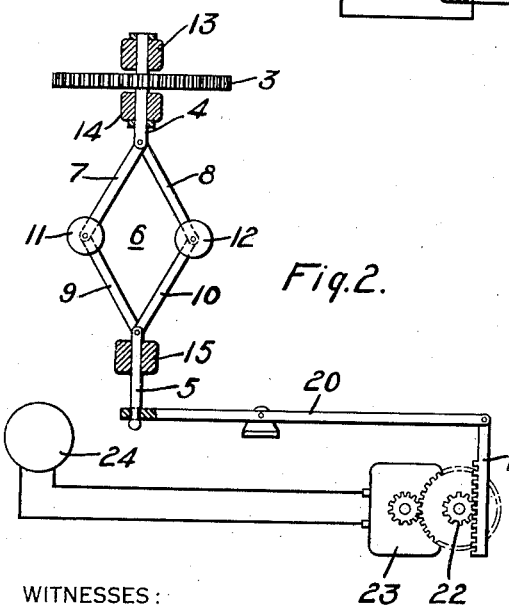
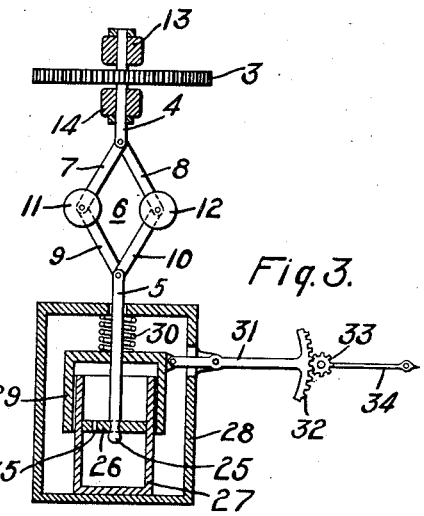

RAYMOND T. PIERCE, OF WILKINSBURG, PENNSYLVANIA, ASSIGNOR TO WESTINGHOUSE ELECTRIC & MANUFACTURING COMPANY, A CORPORATION OF PENNSYLVANIA.

MEASURING INSTRUMENT.

1,395,294.     Specification of Letters Patent.     Patented Nov. 1, 1921.

Application filed April 5, 1917. Serial No. 160,049.

*To all whom it may concern:*

Be it known that I, RAYMOND T. PIERCE, a citizen of the United States, and a resident of Wilkinsburg, in the county of Allegheny and State of Pennsylvania, have invented a new and useful Improvement in Measuring Instruments, of which the following is a specification.

My invention relates to measuring instruments and particularly to accelerometers.

One object of my invention is to provide a measuring instrument that shall have means for indicating the rate of change in speed of a device to which it is connected.

Another object of my invention is to provide an instrument of the above indicated character that shall be simple to construct and positive and efficient in its operation.

In practising my invention, I provide a rotatable member that is adapted to be actuated in accordance with the speed of the device to which it is connected and has a ball-governor device connected intermediate its ends for causing one portion of such rotatable member to be moved longitudinally in accordance with its speed of rotation. A generating or other indicating device may be operatively connected to the longitudinally-movable portion of the rotatable member for the purpose of indicating the rate of change of speed of the rotatable member by a measurement of the rate of longitudinal movement of a portion of the same.

In the accompanying drawings, Figure 1 is a diagrammatic view of an accelerometer embodying my invention, and Figs. 2 and 3 are diagrammatic views of modified forms of accelerometers embodying my invention.

One end of a flexible transmission mechanism 1 is operatively connected to the device (not shown) the rate of change of speed of which is to be determined and its other end is provided with a pinion 2 that is adapted to engage a gear wheel 3 which is mounted on a rotatable shaft 4. The shaft 4 is coupled to an alined shaft 5 by a four-link mechanism 6 that comprises link members 7, 8, 9 and 10 and weight or ball members 11 and 12 disposed adjacent the pivotal points between the links 7 and 8 and 9 and 10, respectively. The shaft 4 is so mounted in bearings 13 and 14 that it is restrained from moving longitudinally, and the shaft 5 is so mounted in a bearing 15 that, when the weight members 11 and 12 are moved outwardly by the centrifugal force caused by the rotation of the shafts 4 and 5, it will be moved upwardly.

In Fig. 1 of the drawings a magnet winding 16, that is supplied with current from a source 17 of constant electromotive force, is mounted on one end of the shaft 5 so as to be inductively related to a relatively stationary winding 18 that is in a closed circuit containing also an indicating measuring instrument 19, such as a voltmeter or an ammeter. It will be understood that either of the windings 16 and 18 may be movable and the other stationary.

Since the shaft 5 will not be moved longitudinally unless the speed of rotation varies, and, since the lines of force set up by the winding 16 will not cut the conductors of the winding 18 unless the shaft 5 is moved longitudinally, it follows that a voltage will be induced in the winding 18 in accordance with the time rate of change of speed of the shafts 4 and 5 and, consequently, of the device to which the accelerometer is connected. That is, so long as the rate of speed varies, the number of lines of force that cut the conductors of the winding 18 is varied and the instrument 19 will indicate a value in accordance with the rate of change of speed or the acceleration. However, when the speed of the shafts 4 and 5 reaches a constant value, the shaft 5 will not move longitudinally and the instrument 19 will indicate zero acceleration.

In Fig. 2 of the drawings, the shaft 5 is operatively connected to one end of a pivoted lever arm 20 that is operatively connected, at its other end, to a rack member 21. The rack member 21 is adapted to drive, through a gear mechanism 22, a magneto 23 that is operatively connected to a measuring instrument 24. When the speed of the shafts 4 and 5 is varying, the shaft 5 is moved longitudinally to cause the magneto 23 to generate a voltage proportional to its speed of rotation, and, consequently, the rate of change of speed of the shafts 4 and 5. When the shafts 4 and 5 attain a constant speed, the shaft 5 will not move longitudinally, the magneto 23 will not be actuated and the instrument 24 will read zero acceleration.

In Fig. 3 of the drawings, the shaft 5 is operatively connected, through a ball-and-socket joint 25, to a piston 26 of a dash pot 27. The dash-pot 27 is mounted in a casing 28 and is provided with an externally closely-fitting cap member 29 that is restrained in one position by a spring 30. The cap member 29 is connected to one end of a pivotally-mounted lever arm 31 the other end of which is provided with a rack 32 that is adapted to engage a pinion 33 to which a pointer 34 is operatively connected. The piston 26 is provided with an escapement vent 35, for purposes hereinafter more fully set forth.

When the device shown in Fig. 3 is used, longitudinal movement of the shaft 5 compresses the fluid in the upper portion of the dash pot 27 and thus causes the cap member 29 to be moved upwardly against the action of the spring 30 to thereby move the pointer 34 very rapidly in a counter-clockwise direction. When the shaft 5 ceases to move upwardly, the vent 35 permits the fluid that has been compressed in the upper portion of the dash pot 27 to flow slowly into its lower portion, thus permitting gravity and the spring 30 to return the pointer 34 to its initial position.

It do not limit my invention to the particular structures illustrated, as it may be variously modified within the scope of the appended claims.

I claim as my invention:

1. An accelerometer comprising a movable member adapted to be moved longitudinally in accordance with its speed of rotation and means actuated by the movable member responsive to the rate of change of movement of the movable member.

2. An accelerometer comprising a rotatable member adapted to be moved longitudinally in accordance with its rate of change of speed and means actuated by the longitudinal movement of the movable member responsive to the rate of change of speed of the rotatable member.

3. An accelerometer comprising a rotatable member adapted to be moved longitudinally in accordance with its change of speed and means adapted to be actuated by the rotatable member in accordance with the change of speed of the rotatable member.

4. An accelerometer comprising a rotatable member adapted to be moved longitudinally in accordance with its change of speed and an indicator adapted to be actuated by the longitudinal movement of the rotatable member in accordance with the time rate of change of speed of the rotatable member.

5. An accelerometer comprising a rotatable shaft, a generator, and an electric meter operatively connected to the generator, said shaft being adapted to be moved longitudinally to actuate the generator in accordance with the acceleration of the shaft.

6. The combination with a rotatable shaft and a generator, of a measuring instrument operatively connected to the generator, and means whereby the shaft is caused to move longitudinally to actuate the generator in accordance with its rate of change of speed.

7. The combination with a rotatable and longitudinally movable member, of inductive means actuated by the longitudinal movement of the movable member to indicate the rate of change in rotational speed of the movable member.

In testimony whereof, I have hereunto subscribed my name this 30th day of March, 1917.

RAYMOND T. PIERCE.